US007571029B2

(12) United States Patent
Dai et al.

(10) Patent No.: US 7,571,029 B2
(45) Date of Patent: Aug. 4, 2009

(54) METHOD AND APPARATUS FOR REPORTING ROAD CONDITIONS

(75) Inventors: Xiaowen Dai, Shelby Township, MI (US); Robert P. Roesser, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 520 days.

(21) Appl. No.: 11/242,743

(22) Filed: Oct. 4, 2005

(65) Prior Publication Data

US 2007/0078570 A1 Apr. 5, 2007

(51) Int. Cl.
*G06F 17/00* (2006.01)

(52) U.S. Cl. .......................................... 701/1; 701/213

(58) Field of Classification Search ..................... 701/1, 701/24–25, 200, 207, 213–215, 117–119; 340/988; 342/357.06, 357.12
See application file for complete search history.

(56) References Cited

U.S. PATENT DOCUMENTS 6,161,071 A * 12/2000 Shuman et al. ............... 701/48
6,542,812 B1 * 4/2003 Obradovich et al. ........ 701/207
2005/0197775 A1 9/2005 Smith

* cited by examiner

*Primary Examiner*—Yonel Beaulieu

(57) ABSTRACT

An on-vehicle system for identifying and reporting external conditions is presented. The system has an operator-selectable user interface to identify occurrence of an external condition, a global positioning system receiver; and, a wireless communications system. The unit may be used to assist in discovering localized roadway conditions that adversely affect safety and travel. The unit is placeable into a vehicle of a volunteer, is manually operated whenever a hazard is detected. Reportable hazards include potholes, obstacles or debris in the highway, snow or ice patches, fog, unusual traffic or pedestrian activity, and localized incidences, such as presence of disabled or emergency vehicles. Nature of the hazard is indicatable by manual activation of additional push buttons or other suitable devices. A GPS receiver is incorporated to estimate position, speed, and heading of the hazard. The information is encoded as a message sent to a central server.

14 Claims, 1 Drawing Sheet

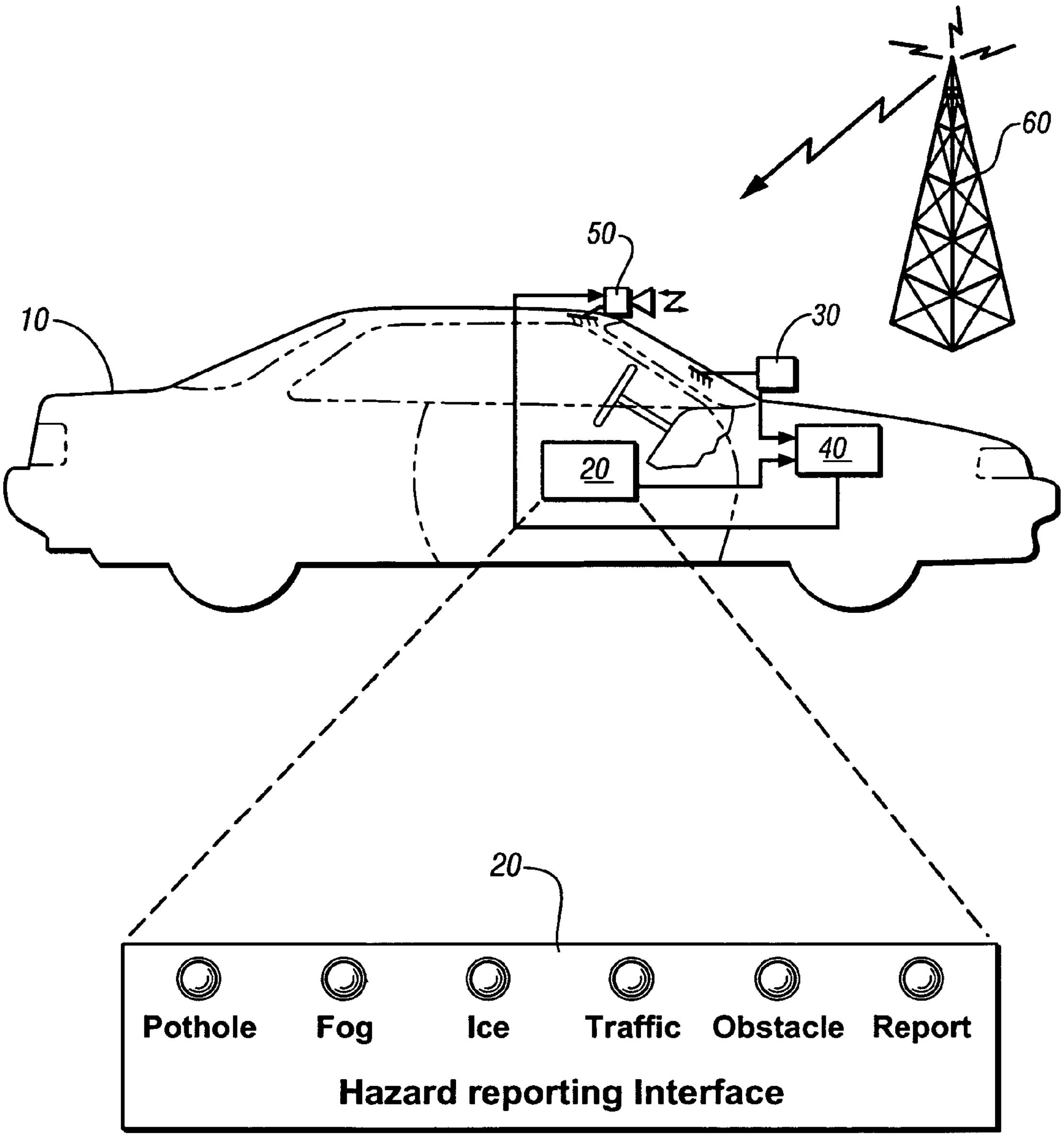
10
20
30
40
50
60
20
Pothole
Fog
Ice
Traffic
Obstacle
Report
Hazard reporting Interface

METHOD AND APPARATUS FOR REPORTING ROAD CONDITIONS

TECHNICAL FIELD

This invention pertains generally to motor vehicles, and more specifically to motor vehicles having on-board capability to measure, analyze, and communicate roadway conditions and traffic patterns.

BACKGROUND OF THE INVENTION

There is a need to provide up-to-date information concerning localized road and traffic conditions, to improve traffic safety, reduce congestion, and improve vehicle throughput. Systems engineers have proposed various systems to meet this need. One such system comprises a wireless system for providing services and time-critical information about places and events to mobile computers and their users proximate to their current locations or potential destinations. This system provides information, including traffic congestion information and user-generated information from bar-coded objects and digital photographs of scenes and other materials. Included is a combination low-radiation dosage-reception handset for wireless communications which includes barcode reader and digital camera peripheral devices for mobile computers, a bracket for interfacing a mobile computer with radio to external systems, and methods for improving the operations of computer reception, search, and display of such information for the edification, efficiency, and enjoyment of computer users.

Another system comprises a traffic alert warning system and method for transmitting a road condition message to operators of vehicles when the system determines that a frequency channel to be used in broadcasting the message is not being used. The traffic alert warning system includes an activity level monitoring circuit for measuring the communication activity of the frequency channel, a channel availability logic circuit for determining when the frequency channel is available for transmission, a storage unit for storing a road condition message, and a transmitter assembly for transmitting the road condition message.

Another system is known for collecting traffic information. One or more aircraft, such as helicopters, fly predetermined flight paths above a geographic area. The flight paths are determined so that portions of roads for which traffic information are to be collected are within the ranges of remote velocity sensors located on board the aircraft during the flights of these aircraft along their respective flight paths. Each aircraft includes positioning equipment that allows the precise position of the aircraft during its flight to be determined. During a flight along the predetermined flight path, the remote velocity sensor in each aircraft is operated to perform scans of locations on roadways in the geographic area. Using a precise road map database and taking into account the location, velocity and attitude of the aircraft while each scan is being made, data indicating traffic conditions along the roadways are collected.

Furthermore, practitioners are developing and implementing on-vehicle short to medium range communications systems, including those referred to as Dedicated Short Range Communications ('DSRC'). These systems provide standardized communications protocols for use in communicating between vehicles, and for use in broadcast communications. A short range communications system complements cellular communications by providing very high data transfer rates in circumstances wherein minimizing latency in the communication link and isolating relatively small communication zones are important. A typical system includes an on-vehicle transponder providing communications, a controller, and a vehicle operator interface. Such systems may be used to facilitate management of road systems to reduce congestion, and provide logistical support to fleet managers.

Even allowing for the above-mentioned technologies, there exists a need for a system whereby a vehicle operator may provide localized, time-crucial information regarding roadway and traffic conditions and other external conditions that affect safety and travel-in a specific area.

SUMMARY OF THE INVENTION

Therefore, an on-vehicle unit for reporting external conditions, including hazards, is proposed which may be used to assist in discovering localized roadway conditions that adversely affect safety and travel. The unit is placeable into a vehicle of a volunteer, and is manually operated by the vehicle operator or other vehicle occupant whenever a hazard is detected. Reportable hazards may include, for example, potholes, obstacles or debris in the highway, snow or ice patches, fog, unusual traffic or pedestrian activity, and localized incidences, such as presence of disabled or emergency vehicles. The nature of the hazard is indicatable by manual activation of additional push buttons or other suitable devices. A global positioning system ('GPS') receiver is incorporated into the host vehicle to estimate position, speed, and heading at the hazard location.

The information for each reported hazard is encoded as a message that is sent to a central server via a wireless communications interface. The user interface is preferably part of the unit.

The central server compiles hazard reports from all participating vehicles, verifies them for consistency, categorizes them and stores the result in a database. The information is made available to assist in management functions such as road management and repair. The data is further compiled and analyzed, and made available to vehicle operators and other users, e.g. traffic reporting services, for use in various publications and rebroadcasts. The information is made available to on-board vehicle navigation systems and publishers and broadcasters of such information, in conjunction with other information, to inform vehicle operators of potential encounters with hazardous conditions.

Therefore, in accordance with the present invention, an on-vehicle system for identifying and reporting external conditions is presented. The system preferably comprises an operator-selectable user interface operable to identify occurrence of an external condition, a global positioning system receiver; and, a wireless communications system.

An aspect of the invention comprises the operator-selectable user interface being an in-cockpit device having a plurality of discrete external conditions.

Another aspect of the invention comprises the discrete external conditions are selectable, and may include road surface conditions, ambient conditions and traffic conditions.

Another aspect of the invention includes the operator-selectable user interface comprising a push-button device.

Another aspect of the invention includes the operator-selectable user interface comprising a graphic-user interface device.

Another aspect of the invention includes the wireless communications system operable to capture a time-stamped location of occurrence of an identified external condition when the operator selects one of the plurality of discrete external conditions of the user interface.

A further aspect of the invention comprises the time-stamped location of occurrence of the identified external condition including a position, speed, and heading of the vehicle at the time of reporting the occurrence of the identified external condition.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawing which forms a part hereof, and wherein:

The FIGURE is a schematic diagram of a system, in accordance with the present invention.

DETAILED DESCRIPTION OF THE PREFERRED EMBODIMENT

Referring now to the drawing, wherein the showings are for the purpose of illustrating the invention only and not for the purpose of limiting the same, the FIGURE shows a schematic diagram of a motor vehicle 10 which has been constructed in accordance with an embodiment of the present invention.

The vehicle 10 preferably comprises a motor vehicle constructed and equipped to operate on highways and roadways. Alternatively, the invention may be executed in any setting wherein multiple vehicles traverse a surface. Exemplary settings include road or building construction sites, agricultural sites, logging trails, manufacturing plants, warehouses, and recreational trails.

The on-vehicle system for identifying and reporting potentially hazardous external road conditions preferably comprises an operator-selectable user interface 20 operable to identify occurrence of an external condition coupled with a global positioning system ('GPS') receiver 30. The user interface 20 and GPS receiver 30 each provide signal information to a message formatter 40. The message formatter 40 delivers a formatted message to a wireless communications transceiver 50, which is operable to communicate with a remote receiver and server 60. The remote server 60 is operable to receive messages, manipulate received messages, and communicate results of received messages accordingly.

The user interface 20 preferably comprises an in-cockpit device having a plurality of user-selectable discrete external conditions and hazards. The user interface 20 preferably takes the form of a push-button device having a plurality of buttons corresponding to discrete external conditions and having some form of feedback or latching device to indicate to the operator that one or more specific buttons have been actuated, or pushed. There is also preferably a "Report" button, useable by the operator to command the system to send a message to the remote server 60 reporting the presence of a specific external condition at a specific location. Alternatively, the user interface 20 may comprise a graphic user interface ('GUI'), known to a skilled practitioner, and executed in the vehicle to provide additional functionality. The GUI includes a video screen having either touch-sensitive capability or an accompanying keyboard or other input/output device (e.g. mouse), wherein the road hazard reporting system comprises one of multiple user systems available to the operator through a selectable menu system. Alternatively, the user interface may take the form of a voice-recognition system.

The plurality of user-selectable discrete external conditions and hazards preferably comprises a combination of road surface conditions, ambient conditions, and traffic conditions, determinable by the specific application of the system. Road surface conditions typically include road hazards such as potholes, disabled vehicles, or other unexpected problems. Ambient conditions typically include localized inclement weather conditions, such as fog, ice, drifting snow, flooding, or other conditions. Traffic conditions typically include presence of local construction projects, emergency vehicles, or high density traffic. The quantity and definition of the reportable plurality of user-selectable discrete external conditions and hazards may instead be definable by the individual or group integrating the aforementioned system into specific vehicles, and is dependent upon the application.

The GPS receiver 30, along with accompanying message formatter 40, is known technology. The GPS receiver 30 is preferably operable to provide position, speed, and heading, i.e. direction, of the vehicle 10 at the time of reporting the occurrence of an identified external condition or road hazard. This is preferably executed in a manner wherein GPS location is captured, or latched, at the time when a specific external condition or hazard is identified by the operator through the user interface 20 by the pressing one of the aforementioned condition buttons.

The message formatter 40 is operable to deliver a formatted message to wireless communications transceiver 50 on the vehicle. The formatted message is preferably a transmittable message comprising the specifically identified external condition, the position, speed, heading of the vehicle 10 and the time the specifically identified external condition was logged or reported, and other identifying information of the communicating vehicle. The message formatter is configured as a standalone control device, or, alternatively, may be integrated into an on-vehicle control system to utilize available computing capability on the vehicle and wireless communications transceiver 50 when the vehicle is configured thusly.

The exemplary wireless communications transceiver 50, operable to communicate with a remote traffic-management center ('TMC') 60 preferably comprises a wireless communications sensor and controller operable to communicate with the message formatter to provide a signal output comprising the formatted message. The wireless communications sensor and controller are preferably adapted to execute a conventional standardized communications protocol, such as a dedicated short-range communications ('DSRC') protocol, to the remote receiver 60. Wireless communications using a dedicated short-range communications ('DSRC') protocol is known to a skilled practitioner.

The remote traffic-management center 60 may comprise a dedicated private system operated for the benefit of individual users, or comprise a public broadcast system operated for the benefit of public subscribers, including vehicle operators, private broadcasters, and public highway management services including highway patrol and road maintenance crews.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. On-vehicle system for manually identifying recognition of external conditions and reporting the external conditions, comprising:

a. a user interface configured to recognize manual user selection indicating the recognition of discrete external conditions selected from a plurality of user selectable discrete external conditions;

b. a global positioning system receiver configured to provide temporal vehicle position upon user selection of discrete external conditions; and, c. a wireless communications system configured to transmit user selected discrete external conditions and corresponding temporal vehicle positions for receipt by a receiver remote from the vehicle.

2. The system of claim 1, wherein the discrete external conditions comprise road surface conditions.

3. The system of claim 1, wherein the discrete external conditions comprise ambient conditions.

4. The system of claim 1, wherein the discrete external conditions comprise traffic conditions.

5. The system of claim 1, wherein the user interface comprises a push-button device.

6. The system of claim 1, wherein the user interface comprises a graphic-user interface device.

7. The system of claim 1, wherein the user interface comprises a voice recognition system.

8. The system of claim 1, wherein said global positioning system receiver is configured to further provide temporal vehicle speed and heading upon user selection of discrete external conditions and said wireless communications system is configured to further transmit said temporal vehicle speed and heading for receipt by a receiver remote from the vehicle.

9. Method for selectively manually identifying and reporting conditions external to a vehicle, comprising:

presenting a plurality of selectable external conditions for manual selection;

monitoring a selectable external condition indication through a user interface, the selectable external condition indication identifying user recognition of one of the selectable external conditions;

determining a time-stamped location where the selectable external condition indication occurred through a GPS device; and reporting the selectable external condition indication and the time-stamped location where the selectable external condition indication occurred through a wireless communication system to a remote server.

10. The method of claim 9, wherein presenting the plurality of selectable external conditions comprises listing a discrete set of external conditions on a graphical interface.

11. The method of claim 9, wherein monitoring the selectable external condition indication through a user interface comprises monitoring a set of push-buttons.

12. The method of claim 9, wherein monitoring the selectable external condition indication through a user interface comprises monitoring a video screen having touch-sensitive capability.

13. The method of claim 9, wherein monitoring the selectable external condition indication through a user interface comprises monitoring a voice-recognition system.

14. On-vehicle system for manually identifying and reporting external conditions, comprising:

a user interface configured for selective manual identification indicating user recognition of said external conditions selected from a plurality of user selectable external conditions;

a global positioning system receiver configured to capture vehicle position at the time of identification of said external conditions; and a wireless communication system configured to transmit a message to a receiver remote from the vehicle including identified external conditions and captured vehicle positions.

* * * * *